United States Patent
Pourreau et al.

(10) Patent No.: US 6,462,117 B1
(45) Date of Patent: Oct. 8, 2002

(54) COATINGS AND INKS BASED ON SOLVENTS HAVING NEGLIGIBLE PHOTOCHEMICAL REACTIVITY

(75) Inventors: Daniel B. Pourreau, Downingtown, PA (US); Shao-Hua Guo, West Goshen, PA (US)

(73) Assignee: Arco Chemical Technology L.P., Greenville, DE (US)

( * ) Notice: Subject to any disclaimer, the term of this patent is extended or adjusted under 35 U.S.C. 154(b) by 0 days.

(21) Appl. No.: 09/829,828

(22) Filed: Apr. 10, 2001

Related U.S. Application Data

(63) Continuation of application No. 08/803,561, filed on Feb. 20, 1997, now abandoned.

(51) Int. Cl.$^7$ .............................................. C08K 5/10
(52) U.S. Cl. ...................................................... 524/315
(58) Field of Search ................................. 524/308, 315

(56) References Cited

U.S. PATENT DOCUMENTS

| | | | |
|---|---|---|---|
| 3,039,982 A | 6/1962 | DeWitt | |
| 3,450,663 A | 6/1969 | Cockerham | |
| 3,676,383 A | 7/1972 | Scala | |
| 3,706,710 A | 12/1972 | Camilleri | |
| 3,785,861 A | * 1/1974 | Tanimura | ................ 117/138.8 |
| 3,878,156 A | 4/1975 | Olstowski | |
| 4,014,845 A | 3/1977 | Grier | |
| 4,183,837 A | 1/1980 | Tamura | |
| 4,379,875 A | 4/1983 | Samuels | |
| 4,739,024 A | * 4/1988 | Moggi | ........................ 526/216 |
| 5,102,938 A | 4/1992 | Roberts | |
| 5,122,560 A | 6/1992 | Johnson | |
| 5,541,275 A | * 7/1996 | Fleischmann | ................ 526/266 |
| 5,662,891 A | * 9/1997 | Martin | ........................ 424/61 |
| 6,048,471 A | 4/2000 | Henry | |

OTHER PUBLICATIONS

Brandrup & Immergut, eds., *Polymer Handbook*, 3$^{rd}$ ed. (1989) VII, 519–544.
R. Atkinson, *Int. J. Chem. Kinet.*, 19 (1987) 799.
R. Atkinson, *Environ. Tox. Chem.*, 7 (1988) 435.

\* cited by examiner

*Primary Examiner*—Paul R. Michl
(74) *Attorney, Agent, or Firm*—Brooks & Kushman P.C.

(57) ABSTRACT

Coating and ink compositions based on organic solvents that have negligible photochemical reactivity and methods for making them are disclosed. The organic solvents have calculated oxidation rate constants of less than about $1\times10^{10}$ cm$^3$/g·sec, and evaporation rates of not more than about 5 times that of n-butyl acetate. Coatings made by the method of the invention are used for wood, furniture, automotive, container, architectural, coil, aerosol, marine, transportation, industrial, ink, overprint varnish, and road-coating applications.

13 Claims, No Drawings

COATINGS AND INKS BASED ON SOLVENTS HAVING NEGLIGIBLE PHOTOCHEMICAL REACTIVITY

This is a continuation of application Ser. No. 08/803,561 filed on Feb. 20, 1997, now abandoned.

FIELD OF THE INVENTION

The invention relates to coating compositions and methods of preparing them. In particular, the invention relates to coatings and inks that contain solvents having negligible photochemical reactivity and favorable evaporation rates.

BACKGROUND OF THE INVENTION

Organic solvents, many of which are classified as VOCs, are widely used in traditional coating formulations (including inks). Generally, an organic compound is classified as a VOC unless it has been proven to not participate in atmospheric photochemical reactions. Ordinarily, these are compounds that undergo hydrogen atom abstraction by atmospheric hydroxyl radicals much faster than ethane. VOCS are hazardous to human health because they react with free radicals in the air and generate tropospheric ozone.

Pursuant to the Clean Air Act of 1990, the U.S. Environmental Protection Agency (EPA) recently mandated significant reductions in the amount of VOCS that may be used in coatings. Because of the mandate, the industry has an acute need for good coating solvents that have negligible photochemical reactivity and can therefore be exempt from regulation. Unfortunately, most organic solvents that have the desired low photochemical reactivity are either poor coating solvents or are subject to other regulations. For example, some solvents are classified as "ozone depleters" under the Montreal Protocol; others are regulated by the EPA as "hazardous air pollutants" (HAP solvents). Few organic solvents are valuable for coatings and have low photochemical reactivity, yet are not ozone depleters or HAP solvents.

The EPA has exempted some solvents from VOC status based on their negligible photochemical reactivity. Examples include acetone, methylene chloride, volatile methyl siloxanes, perchloroethylene, and p-chlorobenzyltrifluoride (PCBTF). Unfortunately, these solvents have drawbacks. Acetone and methylene chloride evaporate too fast. In addition, acetone is water-miscible, so coatings made with it absorb moisture too rapidly from the air. Acetone also has appreciable atmospheric photochemistry aside from its reaction with hydroxyl radicals because it strongly absorbs visible and near-UV light. Methylene chloride and perchloroethylene have toxicity concerns. The more exotic solvents, such as methyl siloxanes and PCBTF, are too expensive and are relatively poor coating solvents, as is evidenced by their relatively low Hansen solubility parameters (less than 8.0 $(cal/cm^3)^{1/2}$).

Traditional approaches to reducing the VOC content of coatings and inks have focused in developing new resins, crosslinkers, and reactive diluents that do not require as much solvent to formulate. These approaches have succeeded only marginally in spite of their considerable expense. For example, water-borne coatings, which developed as an alternative to solvent-borne systems, sometimes contain even more VOCs than comparable high-solids formulations, and often give inferior performance. As another example, powder coatings may use little or no VOCs, but they require expensive equipment to apply and cure.

In sum, the coating and ink industry needs solvents that have low toxicity, are inexpensive, are not regulated as HAP solvents or ozone depleters, do not evaporate too rapidly, are good coating solvents, and most important, have negligible photochemical reactivity and could be exempt from VOC regulations.

SUMMARY OF THE INVENTION

The invention is a method of preparing a coating composition. The method comprises using as a coating component an organic solvent having negligible photochemical reactivity. Such solvents have an oxidation rate constant of less than about $1\times10^{10}$ $cm^3$/g·sec. This is a calculated or measured rate of hydrogen-atom abstraction from a compound by atmospheric hydroxyl radicals. In addition, the organic solvent has an evaporation rate of not more than about 5 times that of n-butyl acetate.

We surprisingly found that, among thousands of possible organic compounds potentially useful as coating and ink solvents, very few meet the needs of the industry, particularly when current VOC restrictions and relative evaporation rates are taken into account. By including a solvent having an oxidation rate constant of less than about $1\times10^{10}$ $cm^3$/g·sec, and also having an evaporation rate of not more than about 5 times that of n-butyl acetate, formulators can significantly reduce the proportion of photochemically reactive solvent used and still make good coatings.

The invention includes thermoplastic and thermoset coating compositions which comprise an organic solvent having negligible photochemical reactivity. These compositions include a resin or a crosslinker or both. The invention benefits coatings used for wood, furniture, automotive OEM, automotive refinish, container, architectural, coil, aerosol, marine, transportation, industrial maintenance, general industrial, inks, overprint varnishes, and road-coating applications.

DETAILED DESCRIPTION OF THE PREFERRED EMBODIMENT(S)

The invention is a method of preparing coating compositions, including inks. The method comprises using as a coating component an organic solvent having negligible photochemical reactivity, and also having an evaporation rate of not more than about 5 times that of n-butyl acetate.

By solvents having "negligible photochemical reactivity," we mean solvents that will undergo free-radical abstraction of a hydrogen atom of the solvent by atmospheric hydroxyl radicals at a measured or calculated rate less than or about equal to the corresponding rate of abstraction of hydrogen atoms from ethane. On a weight basis, this corresponds to an oxidation rate constant of less than about $1\times10^{10}$ $cm^3$/g·sec. Solvents having such low photochemical reactivities are potentially excludable as VOCs under EPA regulations. Solvents preferably used in the method of the invention have oxidation rate constants less than about $5\times10^9$ $cm^3$/g·sec; most preferred are solvents having oxidation rate constants less than about $3\times10^9$ $cm^3$/g·sec.

Oxidation rate constants of various coating solvents appear in Table 1 (below). As shown in the table, many traditional coating solvents such as toluene, xylenes, methyl isobutyl ketone, and n-butyl acetate have relatively high oxidation rate constants and are classified by the EPA as VOCS. In contrast, the method of the invention uses solvents having negligible photochemical reactivity such as those listed in the top half of the table (e.g., tert-butyl acetate, dimethyl carbonate).

In addition to negligible photochemical reactivity, organic solvents useful in the method of the invention are limited to those having useful evaporation rates. Some otherwise useful (and currently VOC-exempt) organic solvents have limited value in coatings because they evaporate too rapidly. Examples are acetone and methylene chloride, which evaporate (respectively) roughly 6 and 14 times faster than n-butyl acetate. Organic solvents useful in the invention have evaporation rates of not more than about 5 times that of n-butyl acetate, which is the industry standard for comparison. More preferred organic solvents have evaporation rates of not more than about 3 times that of n-butyl acetate.

Traditional coating solvents classified as VOCs can be included in the method of the invention. These solvents may be critical for maintaining satisfactory coating processability or performance. Preferably, however, at least about 5 wt. % of the total solvent content of coatings made by the method of the invention comprises one or more organic solvents that have negligible photochemical reactivity and also have an evaporation rate of not more than about 5 times that of n-butyl acetate. More preferably, the organic solvent(s) having negligible photochemical reactivity is the major solvent component, i.e., at least about 50 wt. % of the solvent used is one or more solvents that have negligible photochemical reactivity. The solvent having negligible photochemical reactivity may be the only solvent component.

Organic solvents useful in the method of the invention should have good solvent properties for coatings. Preferably, the solvent will have a total Hansen solubility parameter ($\delta$) of at least about 8.0 $(cal/cm^3)^{1/2}$. If the solvent has a $\delta$ value less than 8.0 $(cal/cm^3)^{1/2}$, it may not adequately solubilize coating components, may give poor film-forming properties, or may contribute to incompletely cured coatings. As noted above, some commercially available organic solvents (e.g., volatile methyl siloxanes and PCBTF) are VOC-exempt, but have $\delta$ values less than 8.0 $(cal/cm^3)^{1/2}$. Hansen solubility parameters and methods for calculating them appear, for example, in *Polymer Handbook*, $3^{rd}$. ed., Brandrup and Immergut, eds. (1989), VII 519–544.

Organic solvents useful in the method of the invention preferably contain no reactive halogen atoms, i.e., they contain no chlorine or bromine atoms, but may contain fluorine. In addition, preferred organic solvents are not regulated by the Montreal Protocol as strospheric ozone depleters (e.g., CFCs), and are not classified by the EPA as hazardous air pollutants (HAP solvents; e.g., methylene chloride, perchloroethylene). Preferred organic solvents have relatively low toxicity.

Most or all of the hydrogen atoms in preferred solvents are part of methyl or tert-butyl groups, i.e., they are "primary" hydrogen atoms. For example, in tert-butyl acetate, all of the hydrogen atoms are part of a methyl group or a tert-butyl group, and are all primary hydrogens. Solvents useful in the invention can have secondary or tertiary hydrogens, but preferably such compounds will have an electron-withdrawing group attached to the carbon having the secondary or tertiary hydrogen atom. For example, 2-nitropropane, a solvent useful in the invention, has a tertiary hydrogen, but it is attached to a carbon having a strong electron-withdrawing group (a nitro group) attached to it. Electron-withdrawing groups are well-known to those skilled in the art, and include, for example, nitro, halogen, carboxyl, carbonate, trifluoromethyl, cyano, acetyl, and the like.

Suitable solvents for use in the invention include, for example, nitroalkanes (e.g., 2-nitropropane, nitroethane, nitro-tert-butane), tert-butyl acetate, methyl benzoate, methyl trifluoroacetate, dimethyl carbonate, methyl pivalate, tert-butyl alcohol, propylene carbonate, tert-butyl benzoate, di-tert-butyl carbonate, methyl tert-butyl carbonate, and the like, and mixtures thereof. Most preferred is tert-butyl acetate.

Coating compositions made by the method of the invention are water-borne or solvent-borne, but are preferably solvent-borne. They contain acrylic, vinyl, amino, urethane, epoxy, alkyd, uralkyd, nitrocellulose, melamine, polyols, polyesters, or other resins that are soluble in the organic solvents used. The resins are thermoplastic or thermoset. The thermoset resins have carboxy, hydroxy, epoxy, isocyanate, amino, silane, anhydride, olefin, or allylic functionalities that are cured by reaction with a crosslinker or by self-crosslinking between polymer chains. Suitable crosslinkers include epoxy resins, isocyanates, melamines, and the like. The coatings can be clear or may contain pigments, fillers, or other additives. The coatings can be cured at ambient temperature or at elevated temperature by baking. The coatings cure by radiation, oxidation, or chemical crosslinking.

The invention includes a method of preparing a coating resin. The method comprises polymerizing one or more ethylenic monomers in the presence of an organic solvent having negligible photochemical reactivity and also having an evaporation rate of not more than about 5 times that of n-butyl acetate. Optionally, the polymerization is performed in the presence of a free-radical initiator. The mixture is heated under conditions effective to polymerize the monomers according to well-known techniques. Suitable ethylenic monomers and free-radical initiators are those well known in the art. The ethylenic monomers include, for example, vinyl aromatic monomers, acrylates, allylic alcohols, allylic esters, allylic ethers, cyclic unsaturated anhydrides, vinyl halides, and the like, and mixtures thereof. Peroxides are preferably used as free-radical initiators. If desired, other types of resins can be prepared in the presence of the organic solvent, such as those made by condensation polymerization (e.g., polyethers and polyesters).

The invention includes thermoplastic and thermoset coating compositions. The compositions comprise a resin or a crosslinker or both. In addition, the compositions comprise an organic solvent having negligible photochemical reactivity as measured by an oxidation rate constant of less than about $1 \times 10^{-13}$ $cm^3/g \cdot sec$, and also having an evaporation rate of not more than about 5 times that of n-butyl acetate.

Any desired technique can be used for applying coatings made by the method of the invention. Suitable techniques include, spraying, brushing, lay down, dipping, or other methods. The coatings can be applied to coated or uncoated metal, plastic, glass, concrete, asphalt, or other hard surfaces. Coatings made by the method of the invention are used in wood, furniture, automotive OEM, automotive refinish, container, architectural, coil, aerosol, marine, transportation, industrial maintenance, general industrial, inks, overprint varnishes, and road-coating applications. The examples below show just a few possible formulations that contain reduced levels of photochemically reactive solvents. The performance characteristics of these coatings should rival those of the comparative examples with larger proportions of photochemically reactive solvents.

Example 23 and Comparative Example 24 show properties of a two-component polyurethane coating made from a hydroxy-acrylic resin. The examples show that excellent coating properties are maintained when tert-butyl acetate is used in place of n-butyl acetate to give a formulation with an 11 wt. % reduction in the content of photochemically reactive organic solvent.

The following examples merely illustrate the invention. Those skilled in the art will recognize many variations that are within the spirit of the invention and scope of the claims.

EXAMPLE A

Preparation of a Zero-VOC Acrylic Resin Solution

Tert-butyl acetate (150 g) is charged to a glass polymerization reactor equipped with reflux condensor, heating mantle, and addition funnel. A mixture of styrene (42 g), methyl methacrylate (42 g), butyl acrylate (35 g), butyl methacrylate (147 g), hydroxyethyl acrylate (84 g), and benzoyl peroxide (20 g) is cooled to 5° C. and is then charged to the addition funnel. The tert-butyl acetate is heated to reflux (98° C.), and the monomer mixture is added gradually over 4 h. The mixture is refluxed for an additional hour after monomer addition is complete. The reactor contents are cooled to room temperature, and the mixture is discharged. The resulting hydroxy-functional acrylic resin solution is expected to have a solids content of about 70 wt. %. The solid component of the resin solution has a hydroxyl number within the range of about 110 to 120 mg KOH/g.

TABLE 1

Oxidation Rate Constants[1] of Coating Solvents ($cm^3/g \cdot sec$)

| | |
|---|---|
| tert-butyl acetate | $2.3 \times 10^9$ |
| dimethyl carbonate | $2.9 \times 10^9$ |
| methyl tert-butyl carbonate | $3.3 \times 10^9$ |
| di-tert-butyl carbonate | $3.5 \times 10^9$ |
| methyl benzoate | $3.7 \times 10^9$ |
| propylene carbonate | $4.1 \times 10^9$ |
| ethane (for comparison) | $5.4 \times 10^9$ |
| tert-butyl benzoate | $7.7 \times 10^9$ |
| tert-butyl alcohol | $8.8 \times 10^9$ |
| n-butyl acetate | $2.5 \times 10^{10}$ |
| toluene | $3.9 \times 10^{10}$ |
| methyl isobutyl ketone | $8.5 \times 10^{10}$ |
| xylenes | $1.3 \times 10^{11}$ |

[1]Weight-based rate of abstraction of a hydrogen atom by atmospheric hydroxyl radicals. Measured or calculated rates in $cm^3/molecule \cdot sec$ are reported by Atkinson. See, for example, R. Atkinson, Int. J. Chem. Kinet., 19 (1987) 799, and R. Atkinson, Environ. Tox. Chem., 7 (1988) 435. The rates here are reported in $cm^3/g \cdot sec$ to correct for volatility and to normalize for differing numbers of hydrogen atoms. To convert a rate in $cm^3/molecule \cdot sec$ to a rate in $cm^3 g \cdot sec$, multiply the former by $6.022 \times 10^{23}$ molecules per mole, and divide by the molecular weight (g/mole) of the solvent.

Example 1 and Comparative Example 2
2K High-Solids
Acrylic-Urethane Gloss Clearcoat for Air-Dry Applications

| Example | 1 | C2 |
|---|---|---|
| Part A: Acrylic Polyol | | |
| G-CURE 105P70 acrylic polyol[1] | 800 | 800 |
| methyl amyl ketone | 0 | 80 |
| tert-butyl acetate | 80 | 0 |
| dibutyltin dilaurate (2% in methyl ethyl ketone) | 7.0 | 7.0 |
| Part B: Isocyanate | | |
| LUXATE HT-2000 isocyanate adduct[2] | 200 | 200 |
| propylene glycol methyl ether acetate | 16.6 | 33.3 |
| methyl ethyl ketone | 0 | 33.3 |
| tert-butyl acetate | 49.9 | 0 |
| Pounds (#) of photochemically reactive solvent | | |
| reactive #s per gallon | 2.4 | 3.3 |
| reactive #s per # of solids applied | 0.35 | 0.52 |

[1]product of Henkel;
[2]product of ARCO Chemical.
The amounts listed are in parts by weight.

Example 3 and Comparative Example 4
White Polyester-Urethane 2K Air-Dry Coating[1]

| Example | 3 | C4 |
|---|---|---|
| Part A | | |
| 5760 polyester resin solution[2] | 28.9 | 28.9 |
| TITANOX 2090 titanium dioxide[3] | 37.3 | 37.3 |
| n-butyl acetate | 0 | 9.45 |
| tert-butyl acetate | 9.45 | 0 |
| soya lechithin | 0.32 | 0.32 |
| BYK 300 additive[4] | 0.40 | 0.40 |
| dibutyltin dilaurate | 0.040 | 0.040 |
| Part B | | |
| DESMODUR N-75 isocyanate adduct[5] | 0 | 19.9 |
| LUXATE HT2000 isocyanate adduct[6] | 14.9 | 0 |
| ethylene glycol ethyl ether acetate | 0 | 3.72 |

Example 3 and Comparative Example 4
White Polyester-Urethane 2K Air-Dry Coating[1]

| Example | 3 | C4 |
|---|---|---|
| tert-butyl acetate | 4.97 | 0 |
| Pounds (#) of photochemically reactive solvent | | |
| reactive #s per gallon | 1.1 | 2.6 |
| reactive #s per # of solids applied | 0.087 | 0.27 |

[1]See E. W. Flick, Contemporary Industrial Coatings, 1985, p. 101.
[2]product of Cargill;
[3]product of Kronos;
[4]product of Byk Chemie;
[5]product of Bayer;
[6]product of ARCO Chemical.
The amounts listed are in parts by weight.

Example 5 and Comparative Example 6
White Alkyd Topcoat[1]

| Example | 5 | C6 |
|---|---|---|
| 5720 alkyd resin solution[2] | 48.7 | 48.7 |
| TITANOX 2090 titanium dioxide[3] | 29.2 | 29.2 |
| BYK 300 additive[4] | 0.20 | 0.20 |
| n-butyl acetate | 0 | 20.3 |
| tert-butyl acetate | 20.3 | 0 |
| cobalt (18%) drier | 0.13 | 0.13 |
| zirconium (18%) drier | 0.39 | 0.39 |
| ACTIV-8 additive[5] | 0.20 | 0.20 |
| EXKIN #2 anti-skinning agent[6] | 0.14 | 0.14 |
| Pounds (#) of photochemically reactive solvent | | |
| reactive #s per gallon | 1.9 | 3.5 |
| reactive #s per # of solids applied | 0.20 | 0.50 |

[1]See E. W. Flick, Contemporary Industrial Coatings, 1985, p. 113.
[2]product of Cargill;
[3]product of Kronos;
[4]product of Byk Chemie;
[5]product of R. T. Vanderbilt;
[6]product of Nuodex.
The amounts listed are in parts by weight.

Example 7 and Comparative Example 8
Polyester Urethane Furniture Coating[1]

| Example | 7 | C8 |
|---|---|---|
| MULTRON R-12A polyester polyol[2] | 275 | 275 |
| MODAFLOW resin modifier[3] | 1.0 | 1.0 |
| DESMODUR HL isocyanate adduct[2] | 370 | 370 |
| toluene | 0 | 179 |
| ethylene glycol ethyl ether acetate | 65 | 175 |
| tert-butyl acetate | 289 | 0 |
| Pounds (#) of photochemically reactive solvent | | |
| reactive #s per gallon | 2.8 | 4.4 |
| reactive #s per # of solids applied | 0.43 | 1.0 |

[1]See M. Ash and I. Ash, A Formulary of Paints and Other Coatings, 1978, p. 203.
[2]product of Bayer;
[3]product of Monsanto.
The amounts listed are in parts by weight.

Example 9 and Comparative Example 10
Acrylic-Nitrocellulose Aircraft White Gloss Coating[1]

| Example | 9 | C10 |
|---|---|---|
| RBH White titanium dioxide dispersion #6610[2] | 23.8 | 23.8 |
| ½ sec RS nitrocellulose[3] | 5.90 | 5.90 |
| ACRYLOID B-82 acrylic resin[4] | 28.6 | 28.6 |
| dioctyl phthalate | 5.40 | 5.40 |
| toluene | 0 | 7.16 |
| methyl ethyl ketone | 0 | 13.1 |
| tert-butyl acetate | 36.3 | 0 |
| methyl isobutyl ketone | 0 | 16.0 |
| Pounds (#) of photochemically reactive solvent | | |
| reactive #s per gallon | 3.8 | 5.2 |
| reactive #s per # of solids applied | 0.58 | 1.5 |

[1]See M. Ash and I. Ash, A Formulary of Paints and Other Coatings, 1978, p. 140.
[2]product of Inmont;
[3]product of Hercules;
[4]product of Rohn and Haas.
The amounts listed are in parts by weight.

Example 11 and Comparative Example 12
Epoxy-Amine Clear Can Coating[1]

| Example | 11 | C12 |
|---|---|---|
| EPON 1001 B-80 epoxy resin[2] | 246 | 246 |
| UNI-REZ 2100P75 curing agent[3] | 250 | 250 |
| n-butyl alcohol | 84.0 | 84.0 |
| n-propyl alcohol | 0 | 62.0 |
| toluene | 0 | 45.6 |
| methyl butyl ketone | 0 | 21.5 |
| tert-butyl acetate | 158 | 0 |
| ethylene glycol ethyl ether | 50.0 | 78.5 |
| Pounds (#) of photochemically reactive solvent | | |
| reactive #s per gallon | 3.2 | 4.0 |
| reactive #s per # of solids applied | 0.64 | 1.1 |

[1]See M. Ash and I. Ash, A Formulary of Paints and Other Coatings, 1978, p. 144.
[2]product of Shell;
[3]product of Union Camp.
The amounts listed are in parts by weight.

Example 13 and Comparative Example 14
Black Acrylic Lacquer for Wood Coatings[1]

| Example | 13 | C14 |
|---|---|---|
| ACRYLOID B-99 acrylic resin solution[2] | 7.67 | 7.67 |
| ACRYLOID B-48N solid acrylic resin[2] | 117 | 117 |
| carbon black | 3.83 | 3.83 |
| toluene | 0 | 144 |
| xylenes | 38.0 | 368 |
| ethylene glycol ethyl ether acetate | 62.8 | 123 |
| tert-butyl acetate | 534 | 0 |
| Pounds (#) of photochemically reactive solvent | | |
| reactive #s per gallon | 3.7 | 6.3 |

Example 13 and Comparative Example 14
Black Acrylic Lacquer for Wood Coatings[1]

| Example | 13 | C14 |
| --- | --- | --- |
| reactive #s per # of solids applied | 0.85 | 5.2 |

[1]See M. Ash and I. Ash, A Formulary of Paints and Other Coatings, 1978, p. 293.
[2]product of Rohm and Haas.
The amounts listed are in parts by weight.

Example 15 and Comparative Example 16
Blue Flexographic Ink[1]

| Example | 15 | C16 |
| --- | --- | --- |
| SUNFAST BLUE 249-2083 dye[2] | 6.32 | 6.32 |
| ACRYLOID DM-55 acrylic resin[3] | 2.11 | 2.11 |
| ACRYLOID B-72 acrylic resin[3] | 23.1 | 23.1 |
| n-propyl acetate | 0.72 | 21.2 |
| ethyl alcohol (denatured) | 23.6 | 38.6 |
| tert-butyl acetate | 42.2 | 0 |
| ethyl acetate | 0 | 8.70 |
| Pounds (#) of photochemically reactive solvent | | |
| reactive #s per gallon | 3.7 | 5.3 |
| reactive #s per # of solids applied | 0.83 | 2.2 |

[1]See E. W. Flick, Printing Ink and Overprint Varnish Formulations, 1991, p. 17.
[2]product of Sun Chemicals;
[3]product of Rohm and Haas.
The amounts listed are in parts by weight.

Example 17 and Comparative Example 18
Beige Polyester-Melamine Baking Enamel for Coil Coatings[1]

| Example | 17 | C18 |
| --- | --- | --- |
| 5781 polyester polyol resin[2] | 27.9 | 27.9 |
| CYMEL 350 melamine resin[3] | 11.7 | 11.7 |
| titanium dioxide pigment | 28.1 | 28.1 |
| carbon black pigment | 0.070 | 0.070 |
| yellow iron oxide pigment | 0.84 | 0.84 |
| silica flatting agent | 2.96 | 2.96 |
| acid catalyst | 1.27 | 1.27 |
| propylene glycol methyl ether acetate | 7.59 | 17.6 |
| n-butyl acetate | 0 | 9.50 |
| methyl pivalate | 19.5 | 0 |
| Pounds (#) of photochemically reactive solvent | | |
| reactive #s per gallon | 1.4 | 3.2 |
| reactive #s per # of solids applied | 0.12 | 0.39 |

[1]See E. W. Flick, Contemporary Industrial Coatings, 1985, p. 95.
[2]product of Cargill;
[3]product of Cytec.
The amounts listed are in parts by weight.

Example 19 and Comparative Example 20
SAA Resinous Polyol--Urethane Clearcoat for Wood[1]

| Example | 19 | C20 |
| --- | --- | --- |
| Part A | | |
| SAA 103 resinous polyol[2] | 150 | 150 |
| n-butyl acetate | 0 | 200 |
| tert-butyl acetate | 200 | 0 |
| Part B | | |
| LUXATE HT2000 isocyanate adduct[2] | 70.0 | 70.0 |
| n-butyl acetate | 0 | 20.0 |
| tert-butyl acetate | 20.0 | 0 |
| Pounds (#) of photochemically reactive solvent | | |
| reactive #s per gallon | 0 | 4.0 |
| reactive #s per # of solids applied | 0 | 1.0 |

[1]Note: Mix parts A and B at 1:1 by weight. Reduce with solvent to the desired application viscosity.
[2]product of ARCO Chemical.
The amounts listed are in parts by weight.

Example 21 and Comparative Example 22
One-Component Thermoplastic Acrylic Clearcoat

| Example | 21 | C22 |
| --- | --- | --- |
| ACRYLOID B-82 solid acrylic resin[1] | 150 | 150 |
| n-butyl acetate | 0 | 225 |
| tert-butyl acetate | 225 | 0 |
| Pounds (#) of photochemically reactive solvent | | |
| reactive #s per gallon | 0 | 4.9 |
| reactive #s per # of solids applied | 0 | 1.5 |

[1]product of Rohm and Haas.
The amounts listed are in parts by weight.

Example 23 and Comparative Example 24
Two-Component Hydroxy-Acrylic Polyurethane Coating

| Example | 23 | C24 |
| --- | --- | --- |
| G-CURE 105P70 acrylic polyol[1] | 100 | 100 |
| T-12 catalyst[2] (1 wt. % in toluene) | 1.9 | 1.9 |
| silicone flow additive (10%) | 0.34 | 0.34 |
| LUXATE HT-2000 isocyanate adduct[3] | 25.5 | 25.5 |
| ethylene glycol ethyl ether acetate | 25.0 | 25.0 |
| methyl amyl ketone | 25.0 | 25.0 |
| n-butyl acetate | 0 | 25.0 |
| tert-butyl acetate | 28.0 | 0 |
| Coating Properties | | |
| Pot life (sec, Zahn #2 cup) T = 0; T = 4 h | 21.1; 29.7 | 21.2; 29.9 |
| Dry time (h, 21.5° C., 59% rel. hum). evap time; gel time; dry time; total | 0.25; 1.5; 2.0; 3.0 | 0.20; 1.4; 1.6; 3.2 |
| Film thickness (mil) | 2.8 | 2.7 |
| Gloss (20°); (60°) | 88; 95 | 88; 95 |
| Pencil hardness; Pendulum hardness | 4H; 89 | 4H; 91 |
| Forward, reverse impact (in./lb.) | 160+; 160+ | 160+; 160+ |
| Adhesion | pass | pass |
| DOI | 90 | 90 |
| Photochemically reactive pounds per | 3.8 | 4.3 |

Example 23 and Comparative Example 24
Two-Component Hydroxy-Acrylic Polyurethane Coating

| Example | 23 | C24 |
|---|---|---|
| gallon | | |
| Chemical & solvent resistance, 30 min.: 10% HCl, 10% HOAc, 10% NaOH, xylenes, MEK; MEK 100 double rubs | no change | no change |

[1]Product of Henkel, 70 wt. % in propylene glycol methyl ether acetate;
[2]product of Air Products;
[3]product of ARCO Chemical.
The amounts listed are in parts by weight. Samples tested on ACT cold roll steel 4 × 12 × 0.0032 B1000 P60 DIW; polish.

Example 25 and Comparative Example 26
Thermoset Overprint Varnish[1]

| Example | 25 | C26 |
|---|---|---|
| CAP 482-0.5 cellulose acetate propionate[2] | 10.8 | 10.8 |
| BECKAMINE 21-511 urea resin[3] | 18.0 | 18.0 |
| acid catalyst | 0.050 | 0.050 |
| ethyl alcohol (denatured) | 24.5 | 49.5 |
| ethyl acetate | 0 | 21.2 |
| methyl pivalate | 46.2 | 0 |
| Pounds (#) of photochemically reactive solvent | | |
| reactive #s per gallon | 4.4 | 5.7 |
| reactive #s per # of solids applied | 1.4 | 3.5 |

[1]See E. W. Flick, Printing Ink and Overprint Varnish Formulations, 1991, p. 122.
[2]product of Eastman;
[3]product of Reichhold.
The amounts listed are in parts by weight.

We claim:

1. A solvent-resin composition consisting essentially of a styrene-allyl alcohol copolymer resin component and a solvent component having a negligible photochemical reactivity, the solvent component being 5–95% by total volume of the solvent-resin composition, the solvent component consisting essentially of t-butyl acetate.

2. A solvent-resin composition consisting essentially of a styrene-allyl alcohol copolymer resin component and a solvent component having a reduced photochemical reactivity, the solvent component being 5–95% by total volume of the solvent-resin composition, the solvent component consisting essentially of t-butyl acetate in an amount of at least about 5 wt. % of the solvent component, and one or more additional organic solvents.

3. The composition of claim 2, wherein the solvent component consists essentially of tert-butyl acetate in an amount of at least 50% by weight.

4. The composition of claim 2, wherein each of the one or more additional organic solvents is a zero-VOC, non-ground-based-ozone-forming solvent.

5. The composition of claim 2, wherein the solvent component has a negligible photochemical reactivity.

6. The composition of claim 2, wherein the solvent component has an evaporation rate of not more than about 5 times that of n-butyl acetate.

7. A thermoplastic or thermoset coating composition which comprises:

(a) a solvent component having a reduced photochemical reactivity, wherein the solvent component comprises tert-butyl acetate in an amount of at least about 5% by weight;

(b) a styrene-allyl alcohol copolymer resin; and (c) one or more crosslinkers.

8. The composition of claim 7, wherein the solvent component has a negligible photochemical reactivity.

9. The composition of claim 7, wherein tert-butyl acetate is the major solvent component.

10. A wood, furniture, automotive OEM, automotive refinish, container, architectural, coil, aerosol, marine, transportation, industrial maintenance, general industrial, ink, overprint varnish, or road coating made from the composition of claim 7.

11. A method of preparing a coating composition, said method comprising dissolving, in a solvent component having a reduced photochemical reactivity and comprising tert-butyl acetate in an amount of at least about 5% by weight, a styrene-allyl alcohol copolymer resin component.

12. The method of claim 11, wherein the solvent component has a negligible photochemical reactivity.

13. The method of claim 11, wherein the solvent component has an evaporation rate of not more than about 5 times that of n-butyl acetate.

* * * * *